April 22, 1969     L. C. MEADE     3,439,977
JOURNAL FOR ACTUATOR OF GLARE REDUCING REAR VISION MIRROR
Filed July 22, 1964
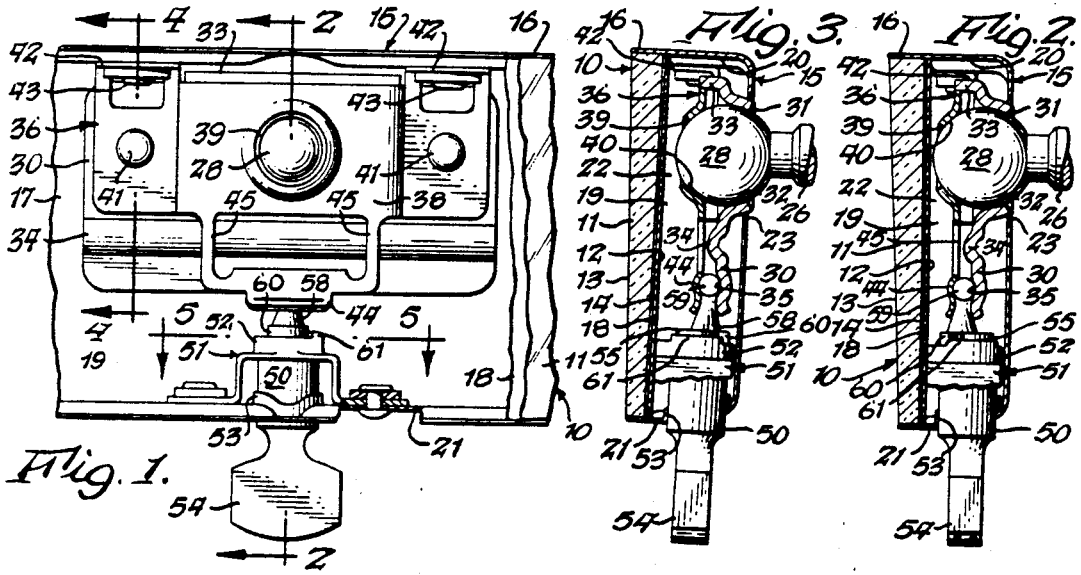
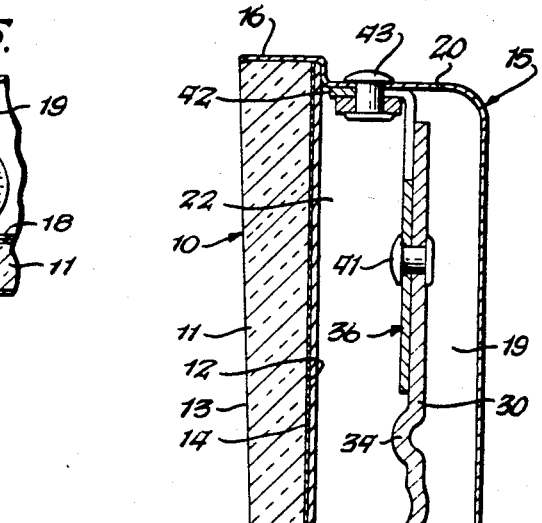
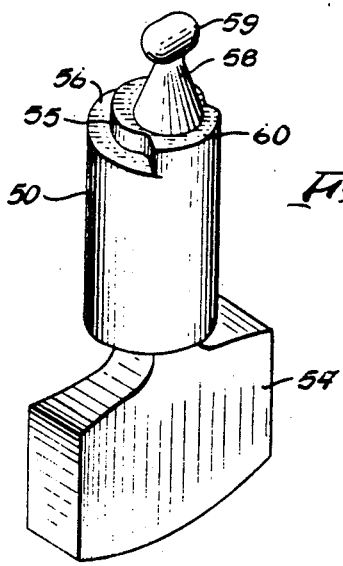
INVENTOR.
Lynn C. Meade
BY
Poppe and Sommer
ATTORNEYS.

United States Patent Office 3,439,977
Patented Apr. 22, 1969

3,439,977
JOURNAL FOR ACTUATOR OF GLARE REDUCING REAR VISION MIRROR
Lynn C. Meade, Buffalo, N.Y., assignor to Standard Mirror Company, Inc., Buffalo, N.Y., a corporation of New York
Filed July 22, 1964, Ser. No. 384,384
Int. Cl. G02b 17/00
U.S. Cl. 350—281                1 Claim

ABSTRACT OF THE DISCLOSURE

To provide a vertical journal for a manual actuator in the bottom flange of a light gage, sheet metal rear vision mirror panel support, a first bearing bushing is struck upwardly through the flange into the interior of the support and a second bearing bushing is provided in a bracket fixed to the inside of the support with the two bearing bushings in axial alinement and rotatably supporting the actuator.

---

The invention is particularly shown as embodied in a rear vision mirror having a single prismoidal mirror as shown in the La Hodny and Bertell Patent 2,325,615 granted Aug. 3, 1943 for Mounting for Rear Vision Mirrors where the high intensity image is reflected from the metallic reflective coating on the back of a prismoidal glass panel and the low intensity image is reflected from the front face of the prismoidal glass panel. It is also possible to employ, with two transparent glass panels arranged at an angle to each other, and one provided with a primary reflective coating, a series of images of reduced intensity by selecting, as disclosed in the Shertz Patent No. 2,455,818 granted Dec. 7, 1948, images which have been subjected to different numbers of cross reflections between the primary reflective surface and the companion transparent plate. In all cases, the different images are selected by adjusting the vertical angularity of the prismoidal mirror or array of transparent panels about a generally horizontal axis generally parallel with both of the reflective surfaces to obtain images of the desired intensity.

The present invention relates to the type of such rear vision mirror in which the angular adjustment of the mirror panel with reference to a stationary support is obtained through turning a fingerpiece or thumb key on a rotatable part journalled at the bottom of the mirror panel to turn about a vertical axis, and which operates an eccentrically located part behind the mirror panel to swing the mirror panel about a generally horizontal axis generally parallel with the mirror panel between two predetermined set positions providing the desired reflectivity.

One of the principal objects of the invention is to provide an improved bearing bushing for the rotatable part, this being provided by a separate bracket secured to the bottom flange of the thin metal mirror panel supporting plate or case and permitting heavier gage metal to be used for the bearing bushing. This is also provided by a second bearing bushing provided in this thin metal mirror panel supporting plate or case in axially spaced relation to the bearing bushing in the heavier gage bracket.

Another object is to provide improved stops limiting the degree to which the rotatable part can be turned, this being accomplished by providing these stops on the heavy gage bracket in which the rotatable part is journalled.

Another object is to provide an improved eccentrically located part which will firmly retain the rotatable part in either of its two predetermined set positions, this being achieved by providing a horizontal axis barrel-shaped cam at the inboard end of the rotatable part and arranged eccentrically to the vertical axis of rotation of the rotatable part.

Other objects and advantages of the invention will be apparent from the following description and drawings in which:

FIG. 1 is an elevational view, with parts broken away, of a rear vision mirror embodying the present invention, viewed from a position facing the reflective mirror panel.

FIG. 2 is a vertical section taken generally on line 2—2, FIG. 1 and showing the mirror adjusted to its position of high intensity reflectivity.

FIG. 3 is a view similar to FIG. 2 showing the mirror adjusted to its position of low intensity reflectivity.

FIG. 4 is an enlarged fragmentary vertical section taken generally on line 4—4, FIG. 1.

FIG. 5 is an enlarged fragmentary horizontal section taken generally on line 5—5, FIG. 1.

FIG. 6 is an enlarged perspective view of the manual actuator which moves the mirror panel from one position of reflectivity to the other.

The invention is shown as embodied in a mounting for a prismoidal mirror panel 10 although it will be understood that the mounting can be used to support a normal mirror in which case the adjustable support as hereinafter described is merely used to move the mirror panel from an operative to an inoperative position and vice versa.

The prismoidal mirror panel 10 is shown as made of a horizontally elongated plate of glass 11 which is ground so that the vertical axis of its rear planar face 12 is at an angle to the vertical axis of its front planar face 13 but the horizontal axes of these faces are parallel. The mirror 10 is thereby wedge-shaped in vertical section and is arranged with its thicker part at its upper end. The glass plate 11 is provided on its rear face with a coating 14 of reflective material, this coating being preferably of a high reflective metal such as silver in view of the fact that a dulled effect is obtained through using the secondary image reflected by the front face 13 of the glass panel 11.

The mirror is encased in a metal mirror panel supporting plate or case 15 the edges 16 of which conform to the edges of the mirror 10 and these edges 16 being flanged or bent around the rim of the mirror panel 10 to provide a bezel, these bent or crimped edges holding the mirror panel against forward or rearward displacement with reference to its supporting plate or case 15. The silvered mirror panel 10 is also preferably backed by a paper protecting sheet 18.

The rim or bezel 16 of the mirror panel supporting plate or case 15 thereby conforms to the outline of the mirror panel 10 and its back 17 is held in spaced relation to the mirror panel 10, to form a chamber 19, by a top flange 20, a bottom flange 21 and end flanges 22 all of which, including the bezel 16, are formed by pressing the mirror panel supporting plate or case 15 into dished or cup-shaped form from thin gauge metal. Along its vertical center line, but substantially closer to its top flange 20 than its bottom flange 21, the back 17 of this case is provided with a hole 23. The entire mechanism for adjusting the mirror 10 to different degrees of reflectivity, as well as to adjust the mirror to suit the height and position of the driver, is contained within the chamber 19 with the exception of a fingerpiece for adjusting the mirror to different degrees of reflectivity without altering the other adjustments of the mirror panel 10.

The stem 26 of a ball 28 extends from this opening 23, this ball preferably being integral with the stem and disposed within the chamber 19 provided by the metal mirror panel supporting plate or case 15 and mirror panel 10. The opposite end of the stem 26 can be secured to the automobile by any suitable mounting (not shown).

The mechanism which permits the rear vision mirror assembly both to be frictionally moved to any position around the surface of the ball 28 and which also permits the mirror panel to be swung to one of two positions about an axis generally horizontal and parallel with both faces 12 and 13 of the glass panel 11 to obtain different degrees of reflectivity is preferably constructed as follows:

The numeral 30 represents a ball engaging plate housed in the chamber 19 and engaging the stem side of the ball 28, having for this purpose an opening 31 which is flanged toward the metal case or shell 15 so as to provide a circular seat 32 engaging the stem side of the ball 28. The upper end edge of this ball engaging plate 30 can have a central horizontal stiffening flange 33 and its bottom part can be stiffened by a horizontal rib 34 and is provided at its center, below this rib 34, with a horizontal cam groove 35 which opens toward the mirror panel 10.

The ball seat 32 is held in frictional engagement with the stem side of the ball 28 by a ball engaging spring plate 36. This spring plate is made of resilient sheet metal and is shown as having its central portion 38 offset toward the reflective mirror panel 10 and provided with a central opening 39 the rim of which is flanged toward the mirror panel 10 so as to provide a seat 40 for that face of the ball 28 which faces the mirror panel 10. The ends of the spring plate 36 on horizontally opposite sides of its offset 38 are riveted or otherwise secured to the other ball engaging plate 30, as indicated at 41, these ends being flexed to the degree necessary to provide the desired frictional resistance or cling of the ball engaging plates 30 and 36 against the ball 28.

The ball engaging spring plate 36 is provided above the rivets 41 with a pair of horizontal flanges 42 which project toward the mirror panel 10 and are fixed to the inside of the top flange 20 of the mirror panel supporting plate 15 by rivets 43 or in any other suitable manner as best shown in FIG. 4. The line of juncture between these flanges 42 and the body of the spring ball engaging plate 36 forms a hinge which permits the mirror panel 10 and its supporting plate or case 15 to be swung relative to the ball engaging or clamping plates 30 and 36 about a generally horizontal axis extending generally parallel with the mirror panel 10.

The mechanism for adjusting the mirror panel 10 to its two reflective positions includes a downward extension of the spring ball engaging plate 36 having a horizontal grooved part 44 with its horizontal groove opening toward the groove 35 and integral vertical end strips or spring arms 45 connecting this horizontal grooved part 44 with the body of the spring ball engaging plate 36.

The actuator comprises a cylindrical member 50, preferably made of an organic plastic, journalled primarily in a bracket 51. This bracket is made of metal of substantially greater thickness or heavier gage than the sheet metal forming the mirror supporting plate or case 15, this being made as light as possible not primarily for economy, but to render the structure frictionally carried by the ball 28 to be as light as possible to reduce the tendency for vibration as well as tendency to lose friction positioning on the ball. This bracket comprises a top cross part formed to provide an upstanding bearing bushing 52 which is in axial alinement with an upstanding bearing bushing 53 offset upwardly from the metal forming the bottom flange 21 of the mirror supporting plate or case 15. The axis of these bearing bushings 52, 53 preferably intersect the axis of the stem 26 of the ball 28 and jointly journal the cylindrical member 50.

This cylindrical member 50 has an integral fingerpiece or key 54 at its lower end which is arranged exteriorly of the mirror supporting plate or case 15 and by which the cylindrical member 50 can be turned in its bearing bushings 52, 53. The opposite or upper end of the cylindrical member 50 has an integral neck 55 of reduced diameter forming an upwardly facing shoulder 56 and the neck 55 has an integral upwardly extending stem 58 terminating in a barrel-shaped cam 59. The axis of this barrel-shaped cam 59 is generally horizontally disposed and is arranged eccentrically or out of line with the vertical axis of rotation of the cylindrical member 50.

If it is desired to limit the movement of the fingerpiece 54 to about 180° so that the fingerpiece is turned, say, clockwise to its high reflectivity position and counterclockwise to the low reflectivity position an integral stop 60 can be provided on the shoulder 56 of the cylindrical member 50 and the upper extremity of the bearing bushing can be offset horizontal toward its axis to form a companion stop 61 riding along the shoulder 56 in the path of the stop 60 thereon.

In the use of the rear vision mirror, with the stem 26 installed in the automobile, the driver, by grasping the bezel 16, turns the mirror panel supporting plate or case 15 relative to the ball 28 to aim the mirror properly and also to level it. Assuming the mirror panel 10 to be in the high intensity position shown in FIG. 2, to adjust it to the low intensity position shown in FIG. 3, he turns the fingerpiece 54 about its generally vertical axis 180°. This rotates the cylindrical member 50 and the barrel-shaped cam 59 at its inner end. The movement of the latter first spreads the spring bar 44 away from the ball engaging plate 30 and then returns to a position with its axis parallel to this plate and spring bar. Since, however, this horizontal axis is offset with reference to the vertical axis of rotation of the cylindrical member 50, the barrel-shaped cam 59 is now displaced to a position further away from the mirror panel 10, thus tipping this mirror panel to the position shown in FIG. 3, the mirror panel hinging about the angular line of connection between the body of the spring plate 36 (connected to the ball 28 by the ball engaging plate 30 and rivets 41) and its top horizontal ears 42 (connected to the mirror panel supporting plate flange 20 by the rivets 43).

The mirror panel 10 can be restored to its original position of high reflectivity (FIG. 2) by turning the fingerpiece 54 another 180°. If it is desired that the fingerpiece 54 turn in either direction from either set position, the stops 60, 61 are eliminated. If, however, it is desired that this fingerpiece be limited to turn clockwise to one position and counterclockwise to the other position, the stops 60, 61 are arranged to effect this. However the positioning of the mirror panel 10 in its two positions of reflectivity is a function of the barrel-shaped cam 59 being offset with reference to the axis of rotation of its cylindrical member 50.

It will be seen that this cylindrical member is reliably journalled not only by the bearing bushing 52 formed from the heavier gage metal used for the bracket 51, but also by the axially remote bearing bushing 53 formed in the lighter gage mirror panel supporting plate 15. It will also be seen that by virtue of the barrel-shape of the cam 59 the mirror panel 10 is positively and accurately held in and urged to one or the other of its two positions of reflectivity.

I claim:

1. A rear vision mirror having a supporting stem with a ball fixed to one end thereof, a first ball engaging plate having a hole surrounded by a seat engaging the stem side of said ball, a second ball engaging plate engaging the side of said ball opposite said stem, one of said ball engaging plates being of a resilient spring metal, means securing said ball engaging plates together in compressive relation to said ball, a light gage sheet metal mirror panel supporting plate having an opening in register with the opening of said first ball engaging plate and surrounding the stem side of said ball, a reflective mirror panel, means fixing the margin of said mirror panel to the margin of said mirror panel supporting plate, the bottom margin of said mirror panel supporting plate being provided by a generally horizontal bottom flange projecting toward said mirror panel and to the outboard edge of which flange the bottom of said mirror panel is fixed, a pivotal connection between said mirror panel supporting plate and one of said ball engaging plates, the axis of said pivotal connection being generally horizontal and extending generally parallel with said mirror panel; wherein the improvement comprises means for swinging said mirror panel supporting plate about said axis from one set position to another set position, and comprising: an integral upstanding first bearing bushing struck upwardly from the metal forming said bottom flange and generally in axial alinement with the center of said ball, an inverted U-shaped bearing bracket straddling said first bearing bushing with its legs secured to said bottom flange on opposite sides of said first bearing bushing and including a second bearing bushing spaced above and in axial alinement with the said first bearing bushing, a cylindrical member jointly journalled in said bearing bushings and projecting downwardly through said first bearing bushing below said bottom flange, a fingerpiece at the lower extremity of said cylindrical member, and a barrel-shaped cam member at the upper extremity of said cylindrical member and clasped between the lower extremities of said ball engaging plates, the axis of said barrel-shaped cam member being generally horizontal and horizontally offset with reference to the generally vertical axis of rotation of said cylindrical member, whereby rotation of said cylindrical member causes said barrel-shaped cam member to coact with at least one of said ball engaging plates to shift said light gage sheet metal mirror panel supporting plate from said one to said another set position in response to manual rotation of said fingerpiece.

References Cited

UNITED STATES PATENTS

| | | | |
|---|---|---|---|
| 2,964,999 | 12/1960 | Mazur | 350—281 |
| 3,029,701 | 4/1962 | Nelson | 350—281 |
| 3,253,510 | 5/1966 | Clayton | 350—281 |

JOHN K. CORBIN, *Primary Examiner.*